United States Patent
Kim

(10) Patent No.: US 8,102,496 B2
(45) Date of Patent: Jan. 24, 2012

(54) DISTORTION RESISTANT ARRAY SUBSTRATE AND TOUCH-SENSITIVE DISPLAY PANEL HAVING THE SAME

(75) Inventor: Dong-Gyu Kim, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 12/634,607

(22) Filed: Dec. 9, 2009

(65) Prior Publication Data

US 2010/0085500 A1  Apr. 8, 2010

Related U.S. Application Data

(62) Division of application No. 11/744,696, filed on May 4, 2007, now Pat. No. 7,649,605.

(30) Foreign Application Priority Data

Jul. 25, 2006 (KR) .......................... 10-2006-0069444

(51) Int. Cl.
*G02F 1/1343* (2006.01)

(52) U.S. Cl. ........................................ 349/141

(58) Field of Classification Search .................. 349/141, 349/39
See application file for complete search history.

(56) References Cited

U.S. PATENT DOCUMENTS

| | | |
|---|---|---|
| 6,118,508 A | 9/2000 | Park |
| 6,323,871 B1 | 11/2001 | Fuijyoshi et al. |
| 6,421,039 B1 | 7/2002 | Moon et al. |
| 2002/0044227 A1 | 4/2002 | Lee |
| 2002/0163604 A1* | 11/2002 | Kim et al. ......................... 349/43 |
| 2003/0025677 A1 | 2/2003 | Iwamoto et al. |
| 2003/0098939 A1 | 5/2003 | Min et al. |
| 2005/0030461 A1 | 2/2005 | Ono et al. |
| 2005/0052607 A1 | 3/2005 | Mori et al. |
| 2005/0185107 A1* | 8/2005 | Ban et al. ......................... 349/42 |
| 2006/0012743 A1 | 1/2006 | Yun et al. |

* cited by examiner

*Primary Examiner* — Mark Robinson
*Assistant Examiner* — Michael Inadomi
(74) *Attorney, Agent, or Firm* — Innovation Counsel LLP

(57) ABSTRACT

An array substrate includes a plurality of gate lines, a plurality of data lines, a plurality of thin-film transistors, a plurality of pixel electrodes, a plurality of common voltage lines and a plurality of common electrodes. The gate lines extend in a first direction. The data lines extend in a second direction substantially perpendicular to the first direction. The thin-film transistor is electrically connected to the gate line and the data line. The pixel electrode is formed in each of pixels defined by the gate lines and the data lines. The common electrode is electrically connected to the common voltage line. The horizontal alignment of the liquid crystal molecules is not changed by externally applied vertical touch pressure so that display quality is improved.

9 Claims, 11 Drawing Sheets

DISTORTION RESISTANT ARRAY SUBSTRATE AND TOUCH-SENSITIVE DISPLAY PANEL HAVING THE SAME

CROSS-REFERENCE TO RELATED APPLICATION

This application is a divisional of U.S. patent application Ser. No. 11/744,696 filed May 4, 2007 which relies for priority upon Korean Patent Application No. 2006-69444 filed in the Korean Intellectual Property Office on Jul. 25, 2006, the contents of which are incorporated herein by reference in its entirety.

BACKGROUND OF THE INVENTION

1. Field of the Invention

The present invention relates to a display panel having a touch-sensitive display and, more particularly, to a display panel that is resistant to image distortion when touched.

2. Description of the Related Art

A flat panel display apparatus such as a liquid crystal display (LCD) having a touch-sensitive screen receives an input signal when touched by an external pen. Generally, an LCD apparatus displays an image using the optical and electrical properties of liquid crystal and displays an image using incident light and/or light from a backlight assembly. AN LCD panel includes an array substrate, a color filter substrate and a liquid crystal layer interposed between the array substrate and the color filter substrate. The array substrate has a thin-film transistor. When pressure is applied to the LCD apparatus by an external pen, the alignment of the liquid crystal molecules in the liquid crystal layer of the LCD apparatus is changed and the image displayed by the LCD apparatus may be locally distorted.

SUMMARY OF THE INVENTION

According to one aspect of the present invention, an array substrate includes a plurality of gate lines, a plurality of data lines, a plurality of thin-film transistors, a plurality of pixel electrodes, a plurality of common voltage lines and a plurality of common electrodes. The gate lines extend in a first direction and the data lines extend in a second direction substantially perpendicular to the first direction. A thin-film transistor is electrically connected to the gate line and the data line. The pixel electrode is formed in each pixel defined by the intersecting directions of the gate lines and the data lines and is electrically connected to the thin-film transistors. A common voltage line extends in the second direction substantially parallel to the data line. The common electrode is formed in each of the pixels, is electrically insulated from the pixel electrode, and is electrically connected to the common voltage line. For example, the pixel electrode and the common electrode may include a transparent conductive material.

The pixel electrode may include a first main pixel electrode, a second main pixel electrode and a plurality of sub pixel electrodes. The first main pixel electrode extends in the first direction, and is adjacent to one of the gate lines. The second main pixel electrode also extends in the first direction, is spaced apart from the first main pixel electrode by a predetermined distance, and is located adjacent to one of the gate lines. The sub pixel electrodes are disposed between the first and second main pixel electrodes to connect the first and second main pixel electrodes, and are arranged in the first direction. The common electrode may be disposed under the pixel electrode, and an insulation layer may be formed between the common electrode and the pixel electrode.

Alternatively, the pixel electrode may include a main pixel electrode and a plurality of sub pixel electrodes. The main pixel electrode extends in the first direction, and is adjacent to one of the gate lines. The sub pixel electrodes protrude from the main pixel electrode toward a consecutive one of the gate lines, and are arranged in the first direction. The common electrode may include a main common electrode and a plurality of sub common electrodes. The main common electrode extends in the first direction, and is adjacent to a consecutive one of the gate lines. The sub common electrodes protrude from the main common electrode toward the main pixel electrode, and are arranged in the first direction.

In another aspect of the present invention, a display panel includes an array substrate, an opposite substrate facing the array substrate and a liquid crystal layer being interposed between the array substrate and the opposite substrate and having liquid crystal molecules.

The array substrate includes a plurality of gate lines, a plurality of data lines, a plurality of thin-film transistors, a plurality of pixel electrodes, a plurality of common voltage lines and a plurality of common electrodes. The gate lines extend in a first direction. The data lines extend in a second direction substantially perpendicular to the first direction. The thin-film transistor is electrically connected to the gate line and the data line. The pixel electrode is formed in each pixel defined by the gate lines and the data lines, and is electrically connected to each of the thin-film transistors. The common voltage line extends in the second direction being substantially parallel with the data line. The common electrode is formed in each of the pixels, and is electrically insulated from the pixel electrode, and is electrically connected to the common voltage line.

For example, the liquid crystal molecules of the liquid crystal layer may be aligned substantially parallel with a surface of the array substrate, and may be rotated by an electric field formed by the pixel electrode and the common electrode by a predetermined angle with being substantially parallel with the surface of the array substrate.

According to the above, the liquid crystal molecules are substantially parallel with the surface of the array substrate. Thus, an alignment of the liquid crystal molecules may not be changed by an external pressure for a touch screen function. Therefore, a display quality may be improved.

BRIEF DESCRIPTION OF THE DRAWINGS

The above and other advantages of the present invention will become readily apparent by reference to the following detailed description when considered in conjunction with the accompanying drawings, in which.

DESCRIPTION OF THE EMBODIMENTS

Figure 1:
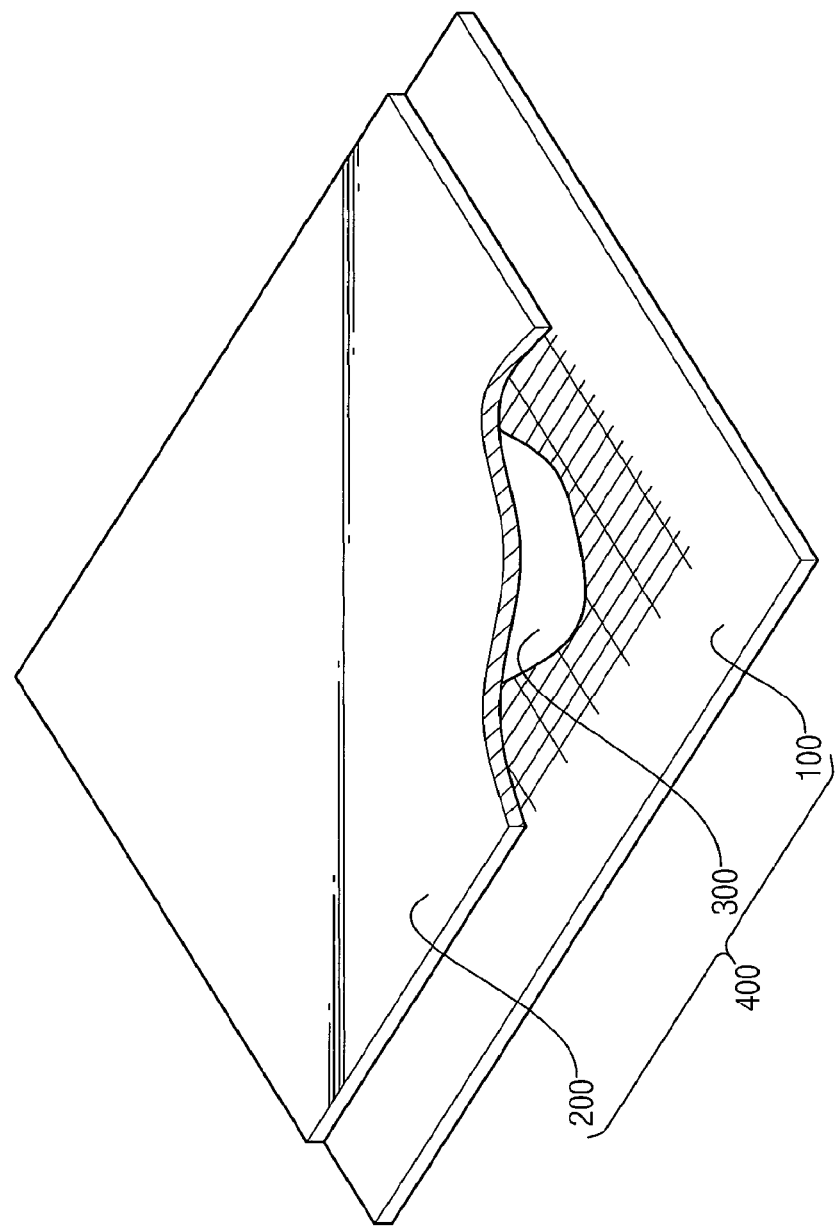
FIG. 1 is a perspective view illustrating a display panel according to an exemplary embodiment of the present invention.

In the drawings, the size and relative sizes of layers and regions may be exaggerated for clarity. It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present.

FIG. 1 is a perspective view illustrating a display panel according to an exemplary embodiment of the present invention.

Referring to FIG. 1, a display panel 400 includes an array substrate 100, an opposite substrate 200 and a liquid crystal layer 300 to display an image using light.

Array substrate 100 includes a plurality of pixel electrodes arranged in a matrix configuration, a plurality of thin-film transistors to apply a driving voltage to the pixel electrodes and a plurality of signal lines to drive the thin-film transistors. Array substrate 100 further includes a common electrode to which a common voltage is applied.

The opposite substrate 200 faces array substrate 100. The opposite substrate 200 may include a plurality of color filters facing the pixel electrodes. Examples of color filters may include a red color filter, a green color filter, a blue color filter, etc.

The liquid crystal layer 300 is interposed between array substrate 100 and the opposite substrate 200. The liquid crystal is reoriented by the varying electric field applied between the pixel electrode and the common electrode. The reoriented crystals control the transmittance of light passing through the color filters to display the image.

Figure 2:
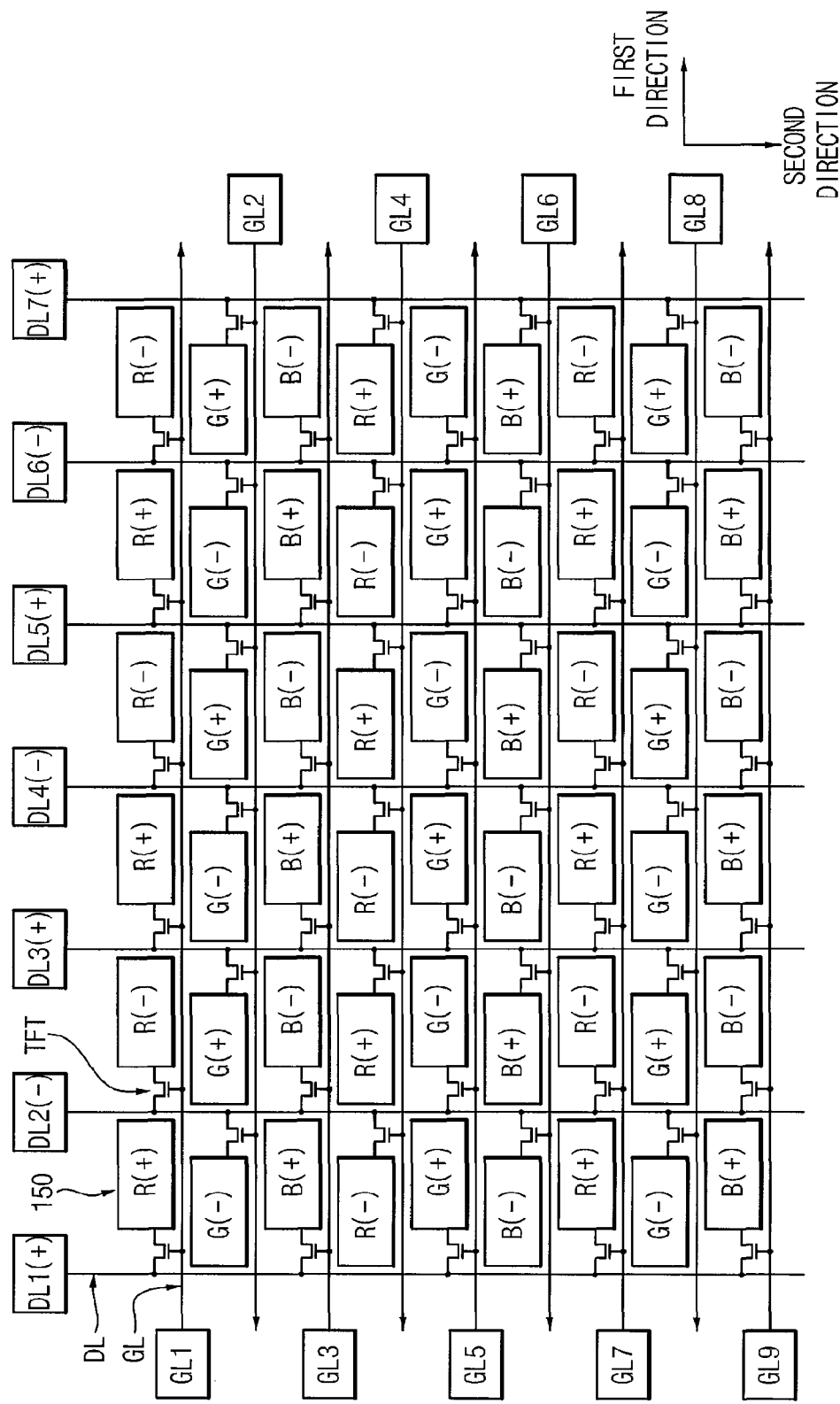
FIG. 2 is a schematic plan view illustrating an array substrate of the display panel illustrated in FIG. 1.

FIG. 2 is a schematic plan view illustrating an array substrate of the display panel illustrated in FIG. 1.

Referring to FIG. 2, array substrate 100 includes a gate line GL, a data line DL, a thin-film transistor TFT and a pixel electrode 150.

A plurality of gate lines GL is arranged in a first direction. A plurality of data lines DL is arranged in a second direction substantially perpendicular to the first direction. For example, array substrate 100 may include nine gate lines GL1, GL2, ..., GL9 and seven data lines DL1, DL2, ..., DL7 as illustrated in FIG. 2. Each of gate lines GL1, GL2, ..., GL9 is electrically connected to a gate driver (not shown), and is provided with a gate signal. Each of data lines DL1, DL2, ..., DL7 is electrically connected to a data driver (not shown), and is provided with a data signal.

The gate driver includes a first gate driver electrically connected to a first end of each odd-numbered gate lines GL1, GL3, ..., GL9 and a second gate driver electrically connected to a second end of each even-numbered gate lines GL2, GL4, ..., GL8, which is opposite to the first end. Alternatively, the gate driver may be electrically connected to an end of each of gate lines GL1, GL2, ..., GL9.

Gate lines GL1, GL2, ..., GL9 cross data lines DL1, DL2, ..., DL7 in a substantially perpendicular direction so that a plurality of pixels is defined on array substrate 100. A pixel electrode 150 is formed in each of the pixels. Thus, a plurality of pixel electrodes 150 is arranged in a matrix configuration on array substrate 100.

Each of the pixels may have a rectangular shape. Thus, pixel electrode 150 formed in each of the pixels may have a shape substantially the same as the shape of each of the pixels.

A thin-film transistor TFT is formed in each of the pixels to correspond to each of the pixel electrodes 150. Thin-film transistor TFT is electrically connected to gate line GL, data line DL and pixel electrode 150. Thin-film transistor TFT is switched by the gate signal on gate line GL to apply the data signal on data line DL to pixel electrode 150. The thin-film transistors TFT electrically connected to one of the data lines DL may be alternatively located adjacent to a first side of data line DL and a second side of data line DL, which is opposite to the first side, when viewed in plan view. Particularly, each of gate lines GL1, GL2, ..., GL9 is electrically connected to the adjacent thin-film transistors TFT arranged in a row.

The thin-film transistors TFT connected to the first data line DL1 are connected to the odd-numbered gate lines GL1, GL3, ..., GL9. The thin-film transistors TFT connected to the seventh data line DL7 are connected to the even-numbered gate lines GL2, GL4 ..., and GL8. The thin-film transistors TFT adjacent to a first side of the remaining data lines DL2, DL3, DL4, DL5 and DL6, are connected to the odd-numbered gate lines GL1, GL3, GL9. The thin-film transistors TFT adjacent to the second side of the remaining data lines DL2, DL3, DL4, DL5 and DL6, are connected to the even-numbered gate lines GL2, GL4, GL8.

For example, each of the data lines DL1, DL2, DL7 may be provided with a data signal for a vertical inversion. For example, when the first data line DL1 is provided with a data signal having a positive voltage in one frame, an adjacent data line, the second data line DL2 is provided with a data signal having a negative voltage in the frame. In contrast, the first data line DL1 is provided with a data signal having a negative voltage in a next frame, and the second data line DL2 is provided with a data signal having a positive voltage in the next frame. Thus, the pixel electrodes 150 may be driven in a dot inversion method.

Figure 3:
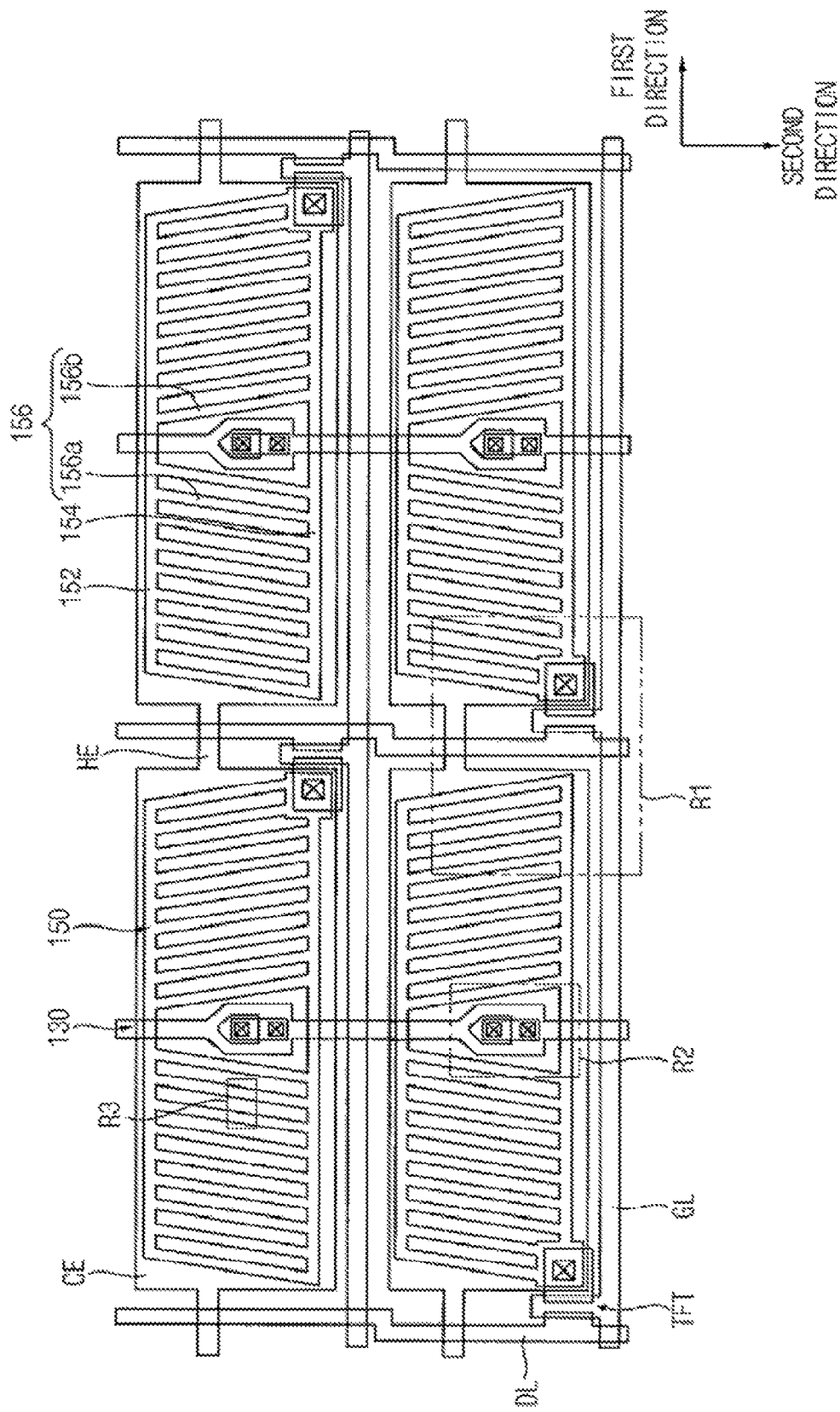
FIG. 3 is an enlarged plan view illustrating a portion of FIG. 2.
Figure 4:
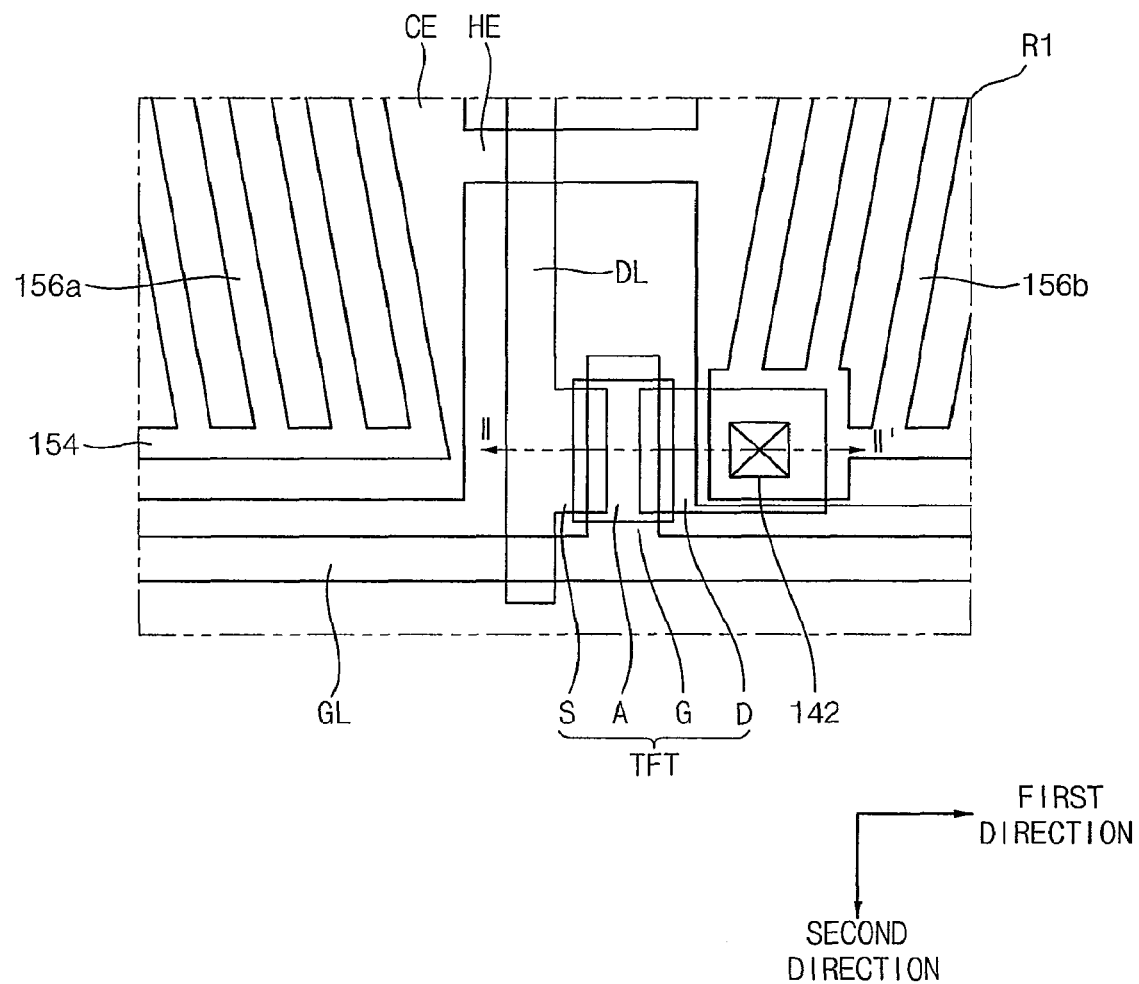
FIG. 4 is an enlarged plan view illustrating a region 'A' of FIG. 3.
Figure 5:
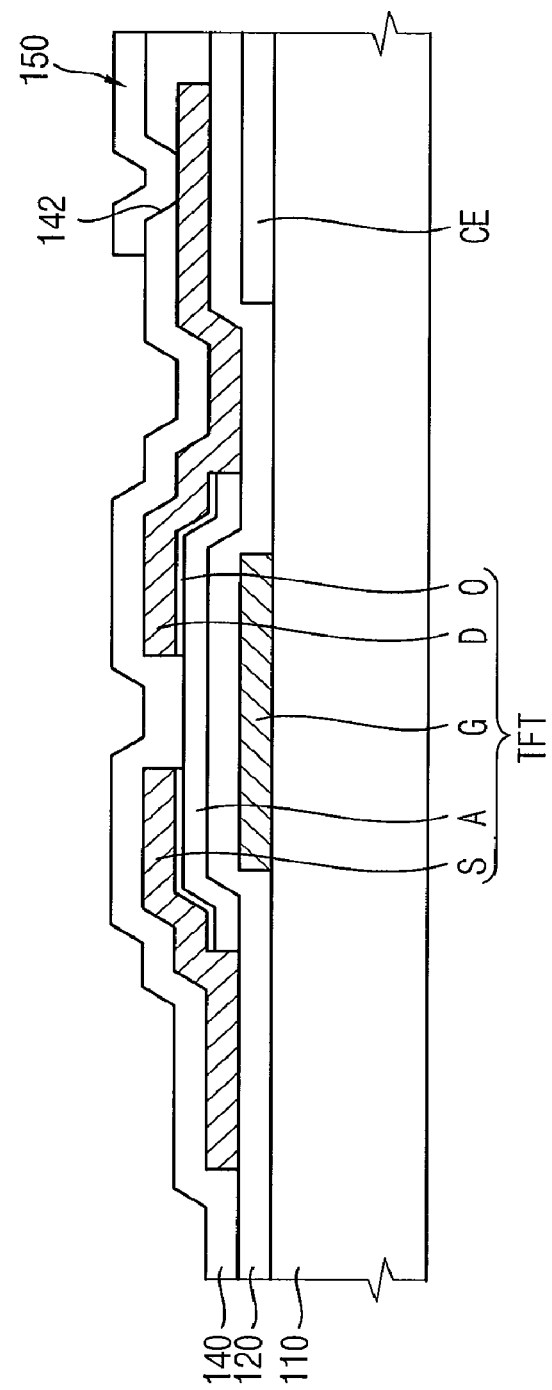
FIG. 5 is a cross-sectional view taken along a line I-I' of FIG. 4.
Figure 6:
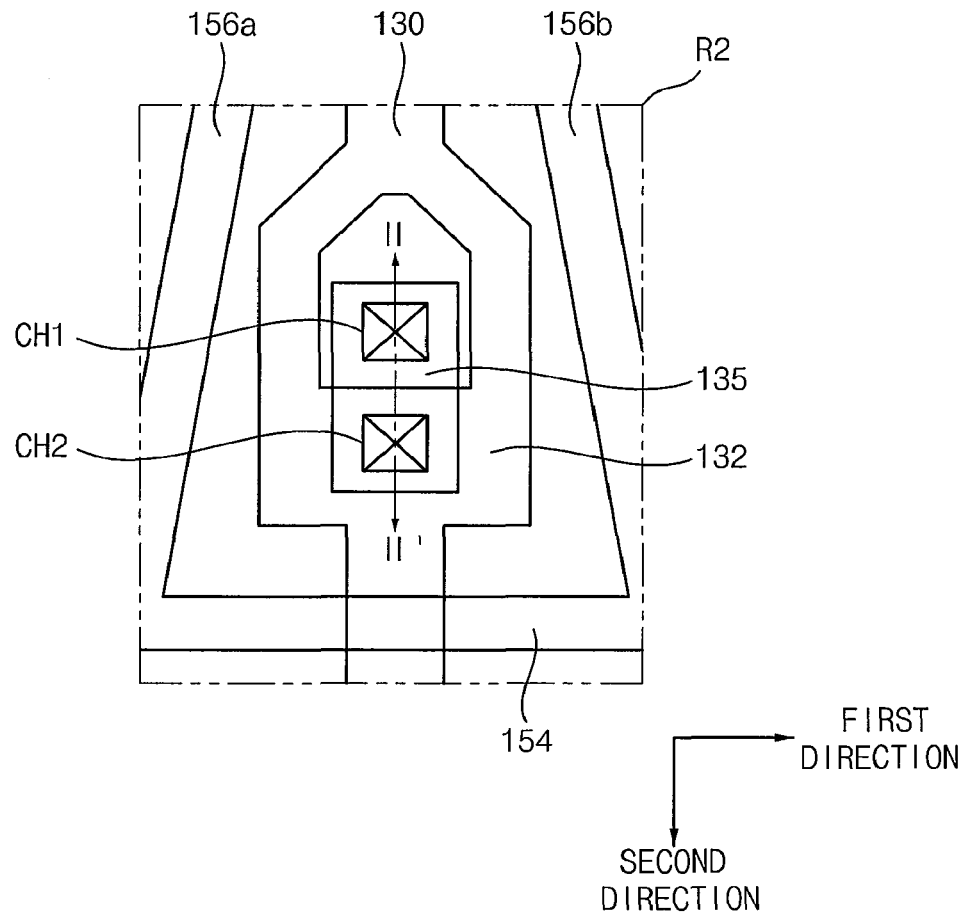
FIG. 6 is an enlarged plan view illustrating a region 'B' of FIG. 3.
Figure 7:
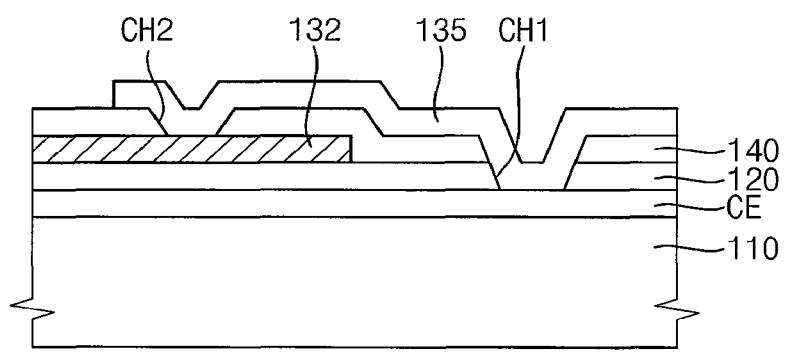
FIG. 7 is a cross-sectional view taken along a line II-II' of FIG. 6.
Figure 8:
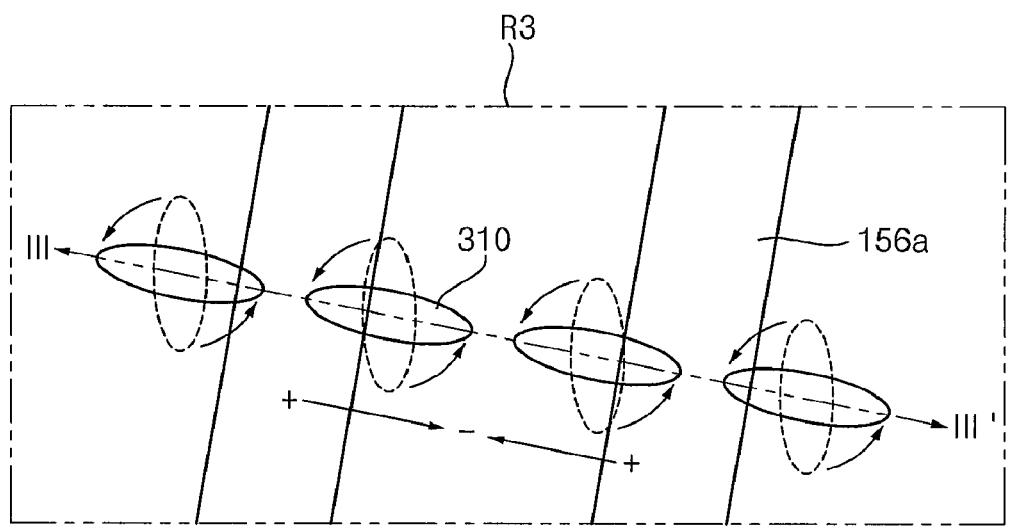
FIG. 8 is an enlarged plan view illustrating a region 'C' of FIG. 3.
Figure 9:
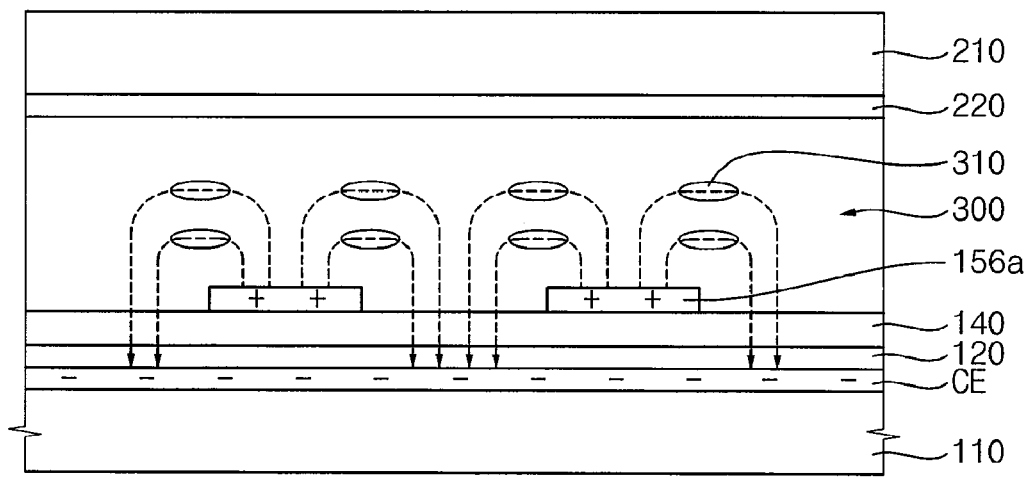
FIG. 9 is a cross-sectional view taken along a line III-III' of FIG. 8.

FIG. 3 is an enlarged plan view illustrating a portion of FIG. 2. FIG. 4 is an enlarged plan view illustrating a region 'A' of FIG. 3. FIG. 5 is a cross-sectional view taken along a line of I-I' of FIG. 4. FIG. 6 is an enlarged plan view illustrating a region 'B' of FIG. 3. FIG. 7 is a cross-sectional view taken along a line II-IF of FIG. 6. FIG. 8 is an enlarged plan view illustrating a region 'C' of FIG. 3. FIG. 9 is a cross-sectional view taken along a line III-III' of FIG. 8.

Referring to FIGS. 1, 3, 4, 5, 6, 7, 8 and 9, a display panel 400 includes an array substrate 100, an opposite substrate 200 and a liquid crystal layer 300.

Array substrate 100 includes a first transparent substrate 110, a gate line GL, a common electrode CE, a horizontal connection electrode HE, a first insulation layer 120, a data line DL, a thin-film transistor TFT, a common voltage line 130, a second insulation layer 140, a pixel electrode 150 and a vertical connection electrode 135.

First transparent substrate 110 has a plate-shape, and includes a transparent material such as glass, quartz, transparent synthetic resin, etc.

Referring to FIG. 3, gate line GL extends a first direction on first transparent substrate 110, and a plurality of data lines DL is arranged in a second direction substantially perpendicular to the first direction.

A first insulation layer 120 is formed on first transparent substrate 110 to cover gate line GL. Examples of a material that may be used for the first insulation layer 120 may include silicon nitride (SiNx), silicon oxide (SiOx), etc.

Referring to FIG. 3, data line DL is formed on the first insulation layer 120, and extends in the second direction to cross gate line GL. A plurality of the data lines DL is arranged in the second direction. Data line DL may have a linear shape in the second direction. Alternatively, data line DL may have a bending portion, for example, a zigzag-shape. The data lines DL cross the gate lines GL so that a plurality of pixels is defined.

Common electrode CE is formed in each of the pixels on first transparent substrate 110, and is covered by first insulation layer 120. Common electrode CE may have a rectangular shape, and may include a transparent conductive material.

The horizontal connection electrode HE is disposed between adjacent common electrodes CE to electrically connect the common electrodes CE to each other. The horizontal connection electrode HE is formed from a layer substantially the same as the common electrode CE. Particularly, the horizontal connection electrode HE is formed on first transparent substrate 110, and is covered by the first insulation layer 120. The horizontal connection electrode HE may include a transparent conductive material.

Referring to FIGS. 3, 4 and 5, thin-film transistor TFT is formed in each of the pixels, and is electrically connected to gate line GL, data line DL and pixel electrode 150.

Particularly, thin-film transistor TFT includes a gate electrode G, an active layer A, a source electrode S, a drain electrode D and an ohmic contact layer O.

Gate electrode G protrudes from gate line GL by a predetermined length. For example, gate electrode G may protrude from gate line GL in a direction substantially parallel with data line DL.

The active layer A is formed on the first insulation layer 120, and is overlapped with gate electrode G. For example, the active layer A may have a rectangular shape, and may include amorphous silicon (a-Si).

Source electrode S protrudes from data line DL by a predetermined length, and is overlapped with a portion of the active layer A. For example, source electrode S may protrude from data line DL in a direction substantially parallel with gate line GL.

Drain electrode D is spaced apart from source electrode S by a predetermined distance, and is formed from a layer substantially the same as source electrode S. Drain electrode D is overlapped with a portion of the active layer A. Furthermore, drain electrode D is overlapped with a portion of pixel electrode 150 to be electrically connected to pixel electrode 150.

Ohmic contact layer O is formed between source electrode S and the active layer A and between drain electrode D and the active layer A. Ohmic contact layer O may include amorphous silicon (a-Si), into which $n^+$ impurities are implanted at a high concentration.

The second insulation layer 140 is formed on the first insulation layer 120 to cover thin-film transistor TFT and data line DL. Examples of a material that may be used for the second insulation layer 140 may include silicon nitride (SiNx), silicon oxide (SiOx), etc.

Referring to FIGS. 3, 6 and 7, the common voltage line 130 extends in the second direction to cross the pixel. A plurality of the common voltage lines 130 is arranged in the first direction. Particularly, the common voltage line 130 may cross a central portion of the pixel. The common voltage line 130 is formed from a layer substantially the same as data line DL. Particularly, the common voltage line 130 is formed on the first insulation layer 130 and is covered by the second insulation layer 140. The common voltage line 130 has a common voltage connection portion 132 to electrically connect the common voltage line 130 and the common electrode CE. For example, an opening may be formed through a central portion of the common voltage connection portion 132, and the common voltage connection portion 132 may be substantially symmetric with respect to a central line of the pixel, which is substantially parallel with the second direction.

Vertical connection electrode 135 is formed on the second insulation layer 140 to electrically connect the common voltage line 130 and the common electrode CE.

Particularly, a portion of each of the first and second insulation layers 120 and 140 is removed to form a first common contact hole CH1. The first common contact hole CH1 may be formed in the opening of the common voltage connection portion 132. Furthermore, a portion of the second insulation layer 140, which is overlapped with the common voltage connection portion 132, is removed to form a second common contact hole CH2.

Vertical connection electrode 135 is formed on the second insulation layer 140, and is electrically connected to the common electrode CE through the first common contact hole CH1, and is electrically connected to the common voltage connection portion 132 through the second common contact hole CH2. Thus, vertical connection electrode 135 electrically connects the common voltage line 130 to the common electrode CE.

Referring to FIGS. 3 and 4, pixel electrode 150 is formed on the second insulation layer 140 in each pixel. Pixel electrode 150 is electrically connected to drain electrode D of thin-film transistor TFT through a pixel contact hole 142 formed through the second insulation layer 140. Pixel electrode 150 includes a transparent conductive material. Common electrode CE disposed under pixel electrode 150 may be larger than pixel electrode 150 to cover pixel electrode 150 when viewed from a plan view.

Pixel electrode 150 includes a first main pixel electrode 152, a second main pixel electrode 154 and a sub pixel electrode 156. Pixel electrode 150 may be substantially symmetric with respect to the central line of the pixel.

The first main pixel electrode 152 is adjacent to one of the gate lines GL, and extends in the first direction.

The second main pixel electrode 154 is spaced apart from the first main pixel electrode 152 by a predetermined distance, and extends in the first direction. Particularly, the second main pixel electrode 154 is adjacent to a consecutive one of the gate lines GL.

The sub pixel electrode 156 is disposed between the first and second main pixel electrodes 152 and 154 to connect the first and second main pixel electrodes 152 and 154 to each other. A plurality of the sub pixel electrodes 156 may be arranged in the first direction.

The sub pixel electrode 156 may be substantially symmetric with respect to the central line of the pixel. For example, the sub pixel electrode 156 may include a first sub pixel electrode 156a and a second sub pixel electrode 156b, which are substantially symmetric with respect to the central line of the pixel.

The first sub pixel electrode 156a is adjacent to a first side of the central line of the pixel, and may be tilted with the second direction by a predetermined angle. For example, the first sub pixel electrode 156a may be tilted with the second direction by about 0.5 to about 5 degrees.

The second sub pixel electrode 156b is adjacent to a second side of the central line of the pixel, which is opposite to the first side, and may be tilted so that the first and second sub pixel electrodes 156a and 156b are substantially symmetric with respect to the central line of the pixel. The second sub pixel electrode 156b is tilted by about 0.5 to about 5 degrees in a direction opposite to the first sub pixel electrode 156a.

Array substrate 100 may further include a first alignment layer (not shown) to align liquid crystal molecules of the liquid crystal layer 300 in a predetermined direction. The first alignment layer is formed on the second insulation layer 140 to cover pixel electrode 150 and vertical connection electrode 135.

Hereinafter, the opposite substrate 200 and the liquid crystal layer 300 are more fully described with reference to FIGS. 8 and 9.

The opposite substrate 200 faces array substrate 100. The opposite substrate 200 includes a second transparent substrate 210 and a light-blocking layer (not shown). The opposite substrate 200 may further include a color filter 220.

The second transparent substrate 210 may include a transparent material, and may have a plate-shape.

The light-blocking layer is formed on the second transparent substrate 210 to face array substrate 100. The light-blocking layer may be large enough to cover gate line GL, data line DL and thin-film transistor TFT.

The color filter 220 is formed on the second transparent substrate 210, and is overlapped with pixel electrode 150. Alternatively, the color filter 220 may be formed on array substrate 100.

The opposite substrate 100 may further include a second alignment layer (not shown) to align the liquid crystal molecules 310 of the liquid crystal layer 300 in a predetermined direction. The second alignment layer covers the color filter 220.

The liquid crystal layer 300 is interposed between array substrate 100 and the opposite substrate 200. The liquid crystal molecules 310 of the liquid crystal layer 300 are aligned by the first and second alignment layers in a predetermined direction. Particularly, the liquid crystal molecules 310 may be aligned substantially parallel with a surface of array substrate 100 in the second direction.

When a first voltage is applied to the common electrode CE, and a second voltage having a voltage level different from the first voltage is applied to pixel electrode 150, an electric field is formed between the common electrode CE and pixel electrode 150. The electric field rotates the liquid crystal molecules 310 by a predetermined angle with maintaining the liquid crystal molecules 310 substantially parallel with the surface of array substrate 100. The liquid crystal molecules 310 disposed on the first sub pixel electrode 156a are rotated in a direction opposite to the rotation direction of the liquid crystal molecules 310 disposed on the second sub pixel electrode 156b. Since the first and second sub pixel electrodes 156a and 156b are tilted in opposite directions, the liquid crystal molecules 310 disposed on the first and second sub pixel electrodes 156a and 156b are prevented from colliding with each other.

In this embodiment, the horizontally aligned liquid crystal molecules 310 of the liquid crystal layer 300 are rotated by the electric field formed between pixel electrode 150 and the common electrode CE by a predetermined angle. Thus, the liquid crystal molecules 310 are not perpendicular to the surface of array substrate 100, but are parallel with the surface of array substrate 100. Since the liquid crystal molecules 310 is substantially parallel with the surface of array substrate 100, the alignment of the liquid crystal molecules 310 may not be changed by the externally applied vertical direction of pressure produced by a pen touching the screen. Thus, the image displayed is not distorted by the touching of the screen with a pen and, accordingly, image quality is improved.

Furthermore, when the pixel has a rectangular shape, of which a first length in the first direction is longer than a second length in the second direction, the number of data lines DL may be reduced. Thus, the number of data driver chips may be reduced thereby lowering both manufacturing cost and power consumption of the display panel.

Figure 10:
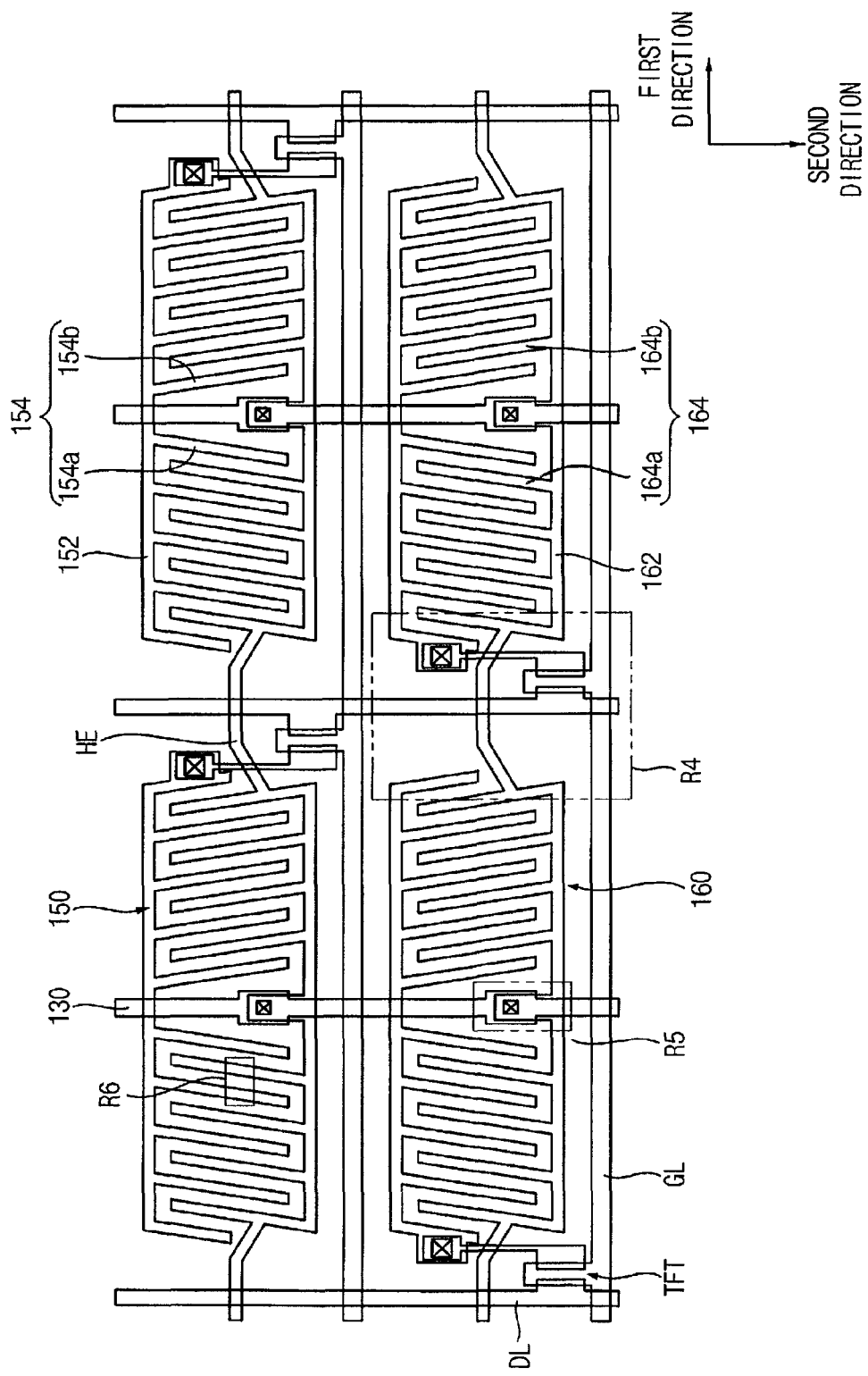
FIG. 10 is a plan view illustrating a portion of an array substrate of a display panel according to another exemplary embodiment of the present invention.
Figure 11:
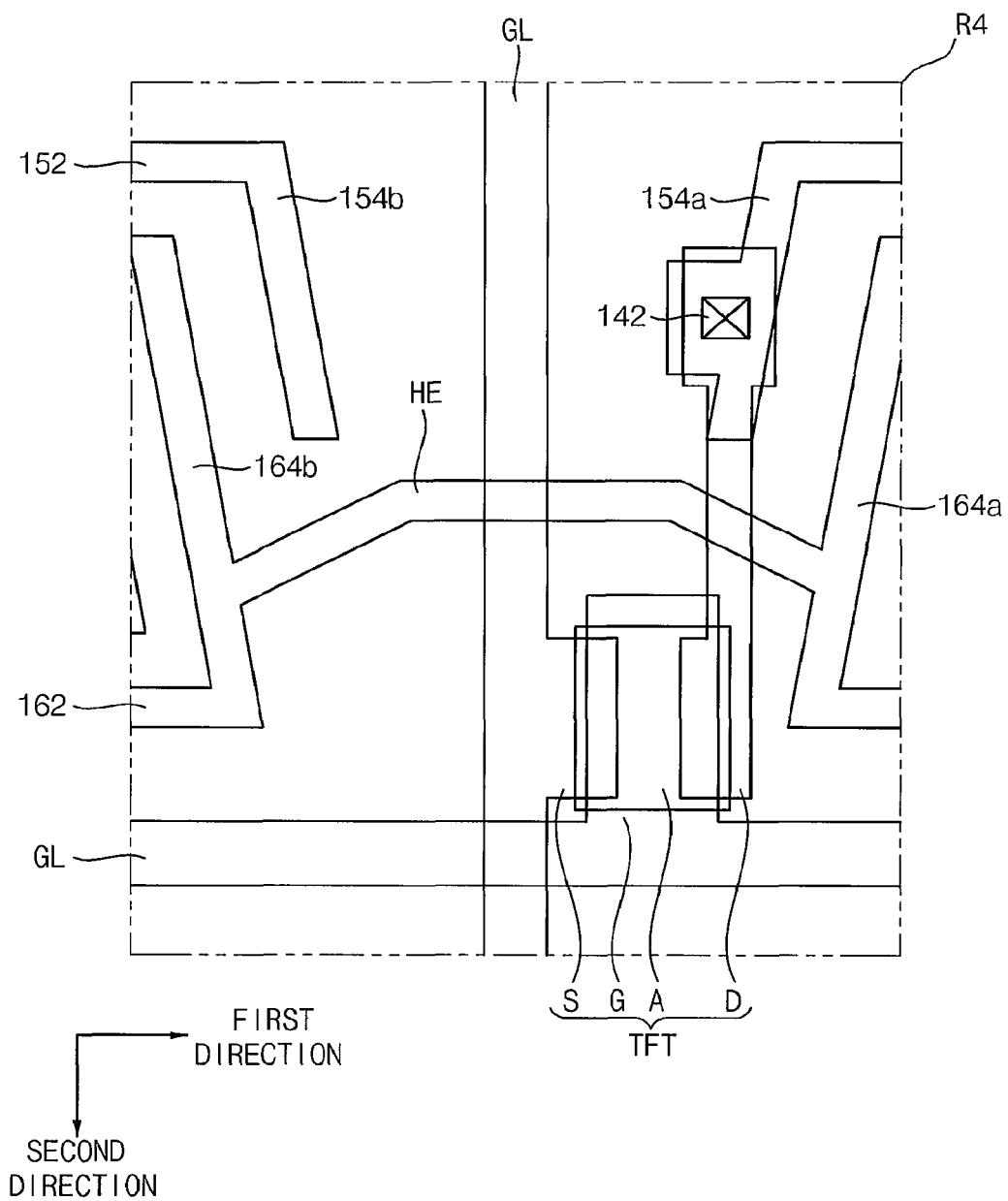
FIG. 11 is an enlarged plan view illustrating a region 'D' of FIG. 10.
Figure 12:
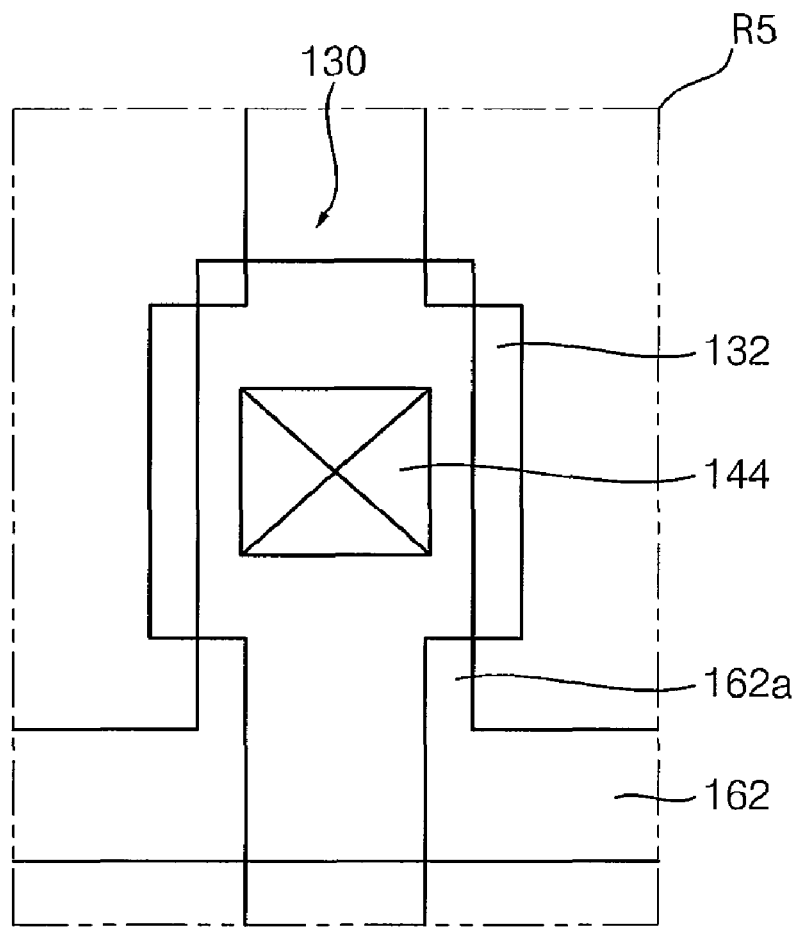
FIG. 12 is an enlarged plan view illustrating a region 'E' of FIG. 10.
Figure 13:
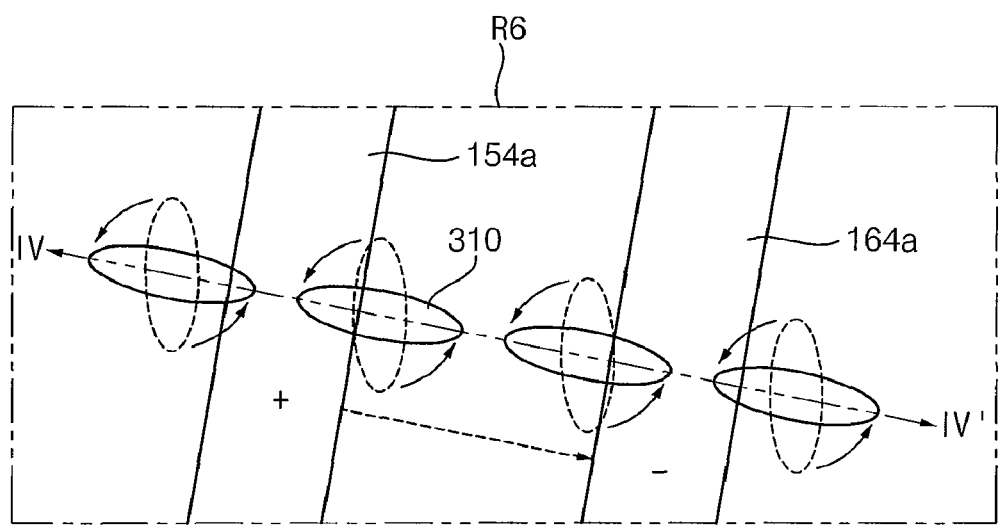
FIG. 13 is an enlarged plan view illustrating a region 'F' of FIG. 10.
Figure 14:
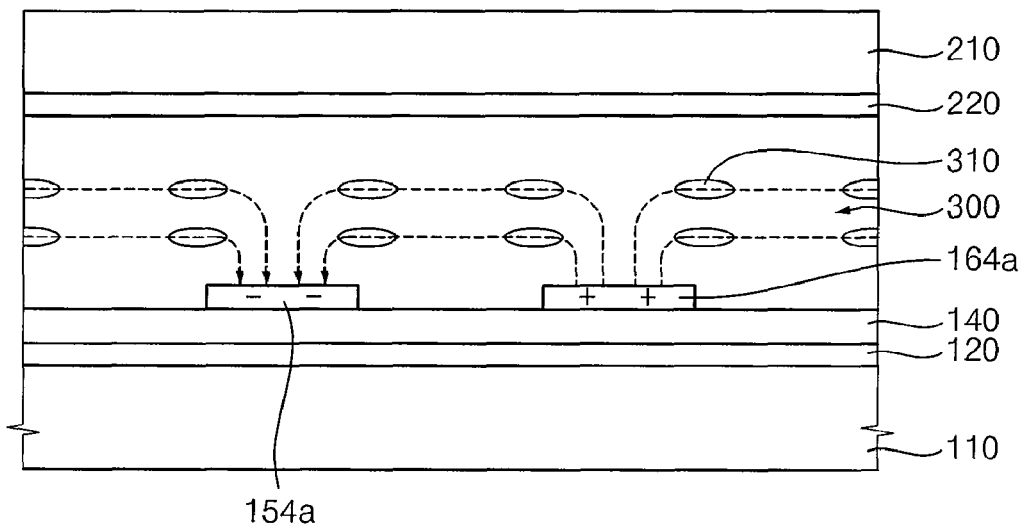
FIG. 14 is a cross-sectional view taken along a line IV-IV' of FIG. 13.

FIG. 10 is a plan view illustrating a portion of an array substrate of a display panel according to another exemplary embodiment of the present invention. FIG. 11 is an enlarged plan view illustrating a region 'D' of FIG. 10. FIG. 12 is an enlarged plan view illustrating a region 'E' of FIG. 10. FIG. 13 is an enlarged plan view illustrating a region 'F' of FIG. 10. FIG. 14 is a cross-sectional view taken along a line IV-IV' of FIG. 13.

Referring to FIGS. 1 and 2, a display panel 400 includes an array substrate 100, an opposite substrate 200 and a liquid crystal layer 300.

Referring to FIGS. 10, 11, 12, 13 and 14, array substrate 100 includes a first transparent substrate 110, a gate line GL, a first insulation layer 120, a data line DL, a thin-film transistor TFT, a common voltage line 130, a second insulation layer 140, a pixel electrode 150, a common electrode 160 and a horizontal connection electrode HE.

First transparent substrate 110 may have a plate-shape, and may include a transparent material. Gate line GL is formed on first transparent substrate 110, and extends in a first direction. A plurality of the gate lines GL is arranged in a second direction substantially perpendicular to the first direction. The first insulation layer 120 is formed on first transparent substrate 110 to cover gate line GL. Data line DL is formed on the first insulation layer 120, and extends in the second direction to cross gate line GL. A plurality of the data lines DL is arranged in the first direction. The data lines DL cross the gate lines GL so that a plurality of pixels is defined. Each of the pixels may have a rectangular shape, of which a first length in the first direction is longer than a second length in the second direction.

Thin-film transistor TFT is formed in each of the pixels, and is electrically connected to gate line GL, data line DL and pixel electrode 150. For example, the thin-film transistors TFT electrically connected to one of the data lines DL may be alternatively adjacent to a first side of data line DL and a second side of data line DL, which is opposite to the first side, when viewed from a plan view.

Referring to FIGS. 10 and 11, thin-film transistor TFT includes a gate electrode G, an active layer A, a source electrode S, a drain electrode D and an ohmic contact layer (not shown).

Gate electrode G protrudes from gate line GL by a predetermined length. For example, gate electrode G may protrude from gate line GL in a direction substantially parallel with data line DL.

The active layer A is formed on the first insulation layer 120, and is overlapped with gate electrode G. For example, the active layer A may have a rectangular shape, and may include amorphous silicon (a-Si).

Source electrode S protrudes from data line DL by a predetermined length, and is overlapped with a portion of the active layer A. For example, source electrode S may protrude from data line DL in a direction substantially parallel with gate line GL.

Drain electrode D is spaced apart from source electrode S by a predetermined distance, and is formed from a layer substantially the same as source electrode S. Drain electrode D is overlapped with a portion of the active layer A. Furthermore, drain electrode D is overlapped with a portion of pixel electrode 150 to be electrically connected to pixel electrode 150.

The ohmic contact layer O is formed between source electrode S and the active layer A and between drain electrode D and the active layer A. The ohmic contact layer O may include amorphous silicon (a-Si), into which $n^+$ impurities are implanted at a high concentration.

Referring to FIG. 10, the common voltage line 130 extends in the second direction to cross the pixel. A plurality of the common voltage lines 130 is arranged in the second direction. Particularly, the common voltage line 130 may cross a central portion of the pixel. The common voltage line 130 is formed from a layer substantially the same as data line DL. Particularly, the common voltage line 130 is formed on the first insulation layer 120.

The second insulation layer 140 is formed on the first insulation layer 120 to cover thin-film transistor TFT, data line DL and the common voltage line 130.

Pixel electrode 150 is formed on the second insulation layer 140 in each of the pixels. Pixel electrode 150 is electrically connected to drain electrode D of thin-film transistor TFT through a pixel contact hole 142 formed through the second insulation layer 140. Pixel electrode 150 includes a transparent conductive material.

Referring to FIG. 10, pixel electrode 150 includes a main pixel electrode 152 and a sub pixel electrode 154. Pixel electrode 150 may be substantially symmetric with respect to a central line of the pixel, which is substantially parallel with the second direction.

The main pixel electrode 152 is adjacent to one of the gate lines GL, and extends in the first direction.

The sub pixel electrode 154 protrudes from the main pixel electrode 152 in a direction opposite to the one of the gate lines GL. A plurality of the sub pixel electrodes 154 may be arranged in the first direction.

The sub pixel electrode 154 may be substantially symmetric with respect to the central line of the pixel. For example, the sub pixel electrode 154 may include a first sub pixel electrode 154a and a second sub pixel electrode 154b, which are substantially symmetric with respect to the central line of the pixel.

The first sub pixel electrode 154a is adjacent to a first side of the central line of the pixel, and may be tilted by a predetermined angle with respect to the second direction. For example, the first sub pixel electrode 154a may be tilted with respect to the second direction by about 0.5 to about 5 degrees.

The second sub pixel electrode 154b is adjacent to a second side of the central line of the pixel, which is opposite to the first side, and may be tilted so that the first and second sub pixel electrodes 154a and 154b are substantially symmetric with respect to the central line of the pixel. Particularly, the second sub pixel electrode 154b may be tilted with the second direction by about 0.5 to about 5 degrees in a direction opposite to the first sub pixel electrode 154a.

Referring to FIGS. 10 and 12, common electrode 160 is formed from a layer substantially the same as pixel electrode 150. Particularly, common electrode 160 is formed on the second insulation layer 140 in each of the pixels, and is electrically insulated from pixel electrode 150. Common electrode 160 is electrically connected to the common voltage line 130 through a common contact hole 144 formed through the second insulation layer 140. Common electrode 160 may include a transparent conductive material substantially the same as pixel electrode 150.

Particularly, common electrode 160 includes a main common electrode 162 and a sub common electrode 164. Common electrode 160 may be substantially symmetric with respect to the central line of the pixel.

The main common electrode 162 extends in the first direction to face the main pixel electrode 152. Particularly, the main common electrode 162 is adjacent to the consecutive one of the gate lines GL.

The sub common electrode 164 protrudes from the main common electrode 162 toward the main pixel electrode 152 without overlapping with the sub pixel electrode 154. A plurality of the sub common electrodes 164 is arranged in the first direction.

The sub common electrode 164 may be substantially symmetric with respect to the central line of the pixel. Particularly, the sub common electrode 164 includes a first sub common electrode 164a and a second sub common electrode 164b, which are symmetric with respect to the central line of the pixel.

The first sub common electrode 164a is adjacent to a first side of the central line of the pixel, and may be tilted in a direction substantially the same as the first sub pixel electrode 154a. For example, the first sub common electrode 164a may be tilted with the second direction by about 0.5 to about 5 degrees. The number of the first sub common electrodes 164a may be the same as the number of the first sub pixel electrodes 154a. The first sub common electrode 164a may be disposed between the first sub pixel electrodes 154a adjacent to each other.

The second sub common electrode 164b is adjacent to a second side of the central line of the pixel, which is opposite to the first side, and may be tilted in a direction substantially the same as the second sub pixel electrode 154b. Particularly, the second sub common electrode 164b is tilted with the second direction by about 0.5 to about 5 degrees in a direction opposite to the first sub common electrode 164a. The number of the second sub common electrodes 164b may be the same as the number of the second sub pixel electrodes 154b. The second sub common electrode 164b may be disposed between the second sub pixel electrodes 154b adjacent to each other.

Referring to FIG. 12, common electrode 160 may further include a vertical connection electrode 162a electrically connected to the common voltage line 130. Furthermore, the common voltage line 130 has a common voltage connection portion 132 electrically connected to common electrode 160. A common contact hole 144 is formed through the second insulation layer 140 to expose a portion of the common voltage connection portion 132.

Particularly, the vertical connection electrode 162a protrudes from the main common electrode 162 along the common voltage line 130 by a predetermined length. Thus, the vertical connection electrode 162a is overlapped with the common voltage connection portion 132, and is electrically connected to the common voltage connection portion 132 through the common contact hole 132.

The horizontal connection electrode HE is disposed between the common electrodes 160 adjacent to each other to electrically connect the common electrodes 160 to each other. The horizontal connection electrode HE is formed from a layer substantially the same as common electrode 160. Particularly, the horizontal connection electrode HE is formed on the second insulation layer 140, and may include a transparent conductive material.

Array substrate 100 further includes a first alignment layer (not shown) to align the liquid crystal layer 300 in a predetermined direction. The first alignment layer is formed on the second insulation layer 140 to cover pixel electrode 150 and common electrode 160.

In this embodiment, pixel electrode 150 is disposed on common electrode 160 when viewed from a plan view. Alternatively, common electrode 160 may be disposed on pixel electrode 150 when viewed from a plan view.

Hereinafter, the opposite substrate 200 and the liquid crystal layer 300 will be described more fully with reference to FIGS. 1, 2, 10, 13 and 14.

The opposite substrate 200 faces array substrate 100. The opposite substrate 200 includes a second transparent substrate 210 and a light-blocking layer (not shown). The opposite substrate 200 may further include a color filter 220.

The second transparent substrate 210 may include a transparent material substantially the same as the first transparent substrate 140, and may have a plate-shape.

The light-blocking layer is formed on the second transparent substrate 210 to face array substrate 100. The light-blocking layer may be large enough to cover gate line GL, data line DL and thin-film transistor TFT.

The color filter 220 is formed on the second transparent substrate 210, and is overlapped with pixel electrode 150. Alternatively, the color filter 220 may be formed on array substrate 100.

The opposite substrate 100 may further include a second alignment layer (not shown) to align the liquid crystal molecules 310 of the liquid crystal layer 300 in a predetermined direction. The second alignment layer covers the color filter 220.

The liquid crystal layer 300 is interposed between array substrate 100 and the opposite substrate 200. The liquid crystal molecules 310 of the liquid crystal layer 300 are aligned by the first and second alignment layers in a predetermined direction. Particularly, the liquid crystal molecules 310 may be aligned substantially parallel with a surface of array substrate 100 in the second direction.

When a first voltage is applied to common electrode 160, and a second voltage having a voltage level different from the first voltage is applied to pixel electrode 150, an electric field is formed between common electrode 160 and pixel electrode 150. The electric field rotates the liquid crystal molecules 310 by a predetermined angle while maintaining the liquid crystal molecules 310 substantially parallel with the surface of array substrate 100. The liquid crystal molecules 310 disposed on the first sub pixel electrode 156a are rotated in a direction opposite to a rotation direction of the liquid crystal molecules 310 disposed on the second sub pixel electrode 156b. Since the first and second sub pixel electrodes 156a and 156b are tilted in an opposite direction, the liquid crystal molecules 310 disposed on the first and second sub pixel electrodes 156a and 156b are prevented from colliding with each other.

According to the above, an array substrate includes a pixel electrode and a common electrode so that the horizontally aligned liquid crystal molecules of a liquid crystal layer are rotated by an electric field formed between the pixel electrode and the common electrode by a predetermined angle. Thus, the liquid crystal molecules are not perpendicular to the surface of the array substrate, but parallel with the surface of the array substrate. Therefore, the alignment of the liquid crystal molecules is not changed by an externally applied pressure from a pen touching the screen and display quality is thereby improved.

Furthermore, the pixel has a rectangular shape in which a first length in a row direction is longer than a second direction in a column direction. Thus, the number of data lines DL may be reduced. Therefore, the number of data driver chips may be reduced so that a manufacturing cost and power consumption of the display panel are reduced.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. An array substrate comprising:
 a plurality of gate lines extending in a first direction;
 a plurality of data lines extending in a second direction substantially perpendicular to the first direction, the intersecting directions of the data lines and gate lines defining a plurality of pixels;
 a plurality of thin-film transistors electrically connected to the gate lines and the data lines;
 a pixel electrode electrically connected to a thin-film transistor;
 a common voltage line extending in the second direction substantially parallel with the data lines;
 an insulation layer formed on the common voltage line;
 a common electrode formed in each of the pixels, electrically insulated from the pixel electrode, and electrically connected to the common voltage line, and
 a horizontal connection electrode disposed between adjacent common electrodes and electrically connecting the adjacent common electrodes to each other,
 wherein the common electrode is formed from a layer substantially the same as the pixel electrode on the insulation layer,
 wherein the horizontal connection electrode is formed from the layer substantially the same as the common electrode.

2. The array substrate of claim 1, wherein the pixel electrode and the common electrode comprise a transparent conductive material.

3. The array substrate of claim 2, wherein the pixel electrode comprises:
 a main pixel electrode that extends in the first direction, and is adjacent to one of the gate lines; and
 a plurality of sub pixel electrodes protruding from the main pixel electrode toward a consecutive one of the gate lines, the sub pixel electrodes being arranged in the first direction.

4. The array substrate of claim 3, wherein the common electrode comprises:
 a main common electrode that extends in the first direction, and is adjacent to a consecutive one of the gate lines; and
 a plurality of sub common electrodes protruding from the main common electrode toward the main pixel electrode, the sub common electrodes being arranged in the first direction.

5. The array substrate of claim 4, wherein the sub pixel electrodes are symmetric with respect to a central line of a pixel, which is substantially parallel with the second direction, and the sub common electrodes are symmetric with respect to the central line.

6. The array substrate of claim 5, wherein the sub pixel electrodes comprise:
a first sub pixel electrode that is adjacent to a first side of the central line, and is tilted at a predetermined angle to the second direction; and
a second sub pixel electrode that is adjacent to a second side of the central line, which is opposite to the first side, and is tilted at a predetermined angle to the second direction so that the first and second sub pixel electrodes are symmetric with respect to the central line, and
the sub common electrodes comprise:
a first sub common electrode that is adjacent to a first side of the central line, and is substantially parallel with the first sub pixel electrode; and
a second sub common electrode that is adjacent to a second side of the central line, which is opposite to the first side, and is substantially parallel with the second sub pixel electrode.

7. The array substrate of claim 4, wherein the common electrode is formed over the common voltage line and is electrically connected to the common voltage line through a contact hole formed through the insulation layer.

8. A display panel comprising:
an array substrate that comprises:
a plurality of gate lines extending in a first direction;
a plurality of data lines extending in a second direction substantially perpendicular to the first direction;
a plurality of thin-film transistors electrically connected to the gate line and the data line;
a pixel electrode electrically connected to each of the thin-film transistors;
a common voltage line extending in the second direction substantially parallel with the data line;
an insulation layer formed on the common voltage line;
a common electrode formed in each of the pixels electrically insulated from the pixel electrode and electrically connected to the common voltage line;
an opposite substrate facing the array substrate;
a liquid crystal layer interposed between the array substrate and the opposite substrate and having liquid crystal molecules, and
a horizontal connection electrode disposed between adjacent common electrodes and electrically connecting the adjacent common electrodes to each other,
wherein the common electrode is formed from a layer substantially the same as the pixel electrode on the insulation layer, and
wherein the horizontal connection electrode is formed from the layer substantially the same as the common electrode.

9. The display panel of claim 8, wherein the liquid crystal molecules of the liquid crystal layer are aligned substantially parallel with a surface of the array substrate, and are rotated by an electric field formed by the pixel electrode and the common electrode by a predetermined angle while being substantially parallel with the surface of the array substrate.

* * * * *